US011015350B2

(12) United States Patent
Gebhardt et al.

(10) Patent No.: US 11,015,350 B2
(45) Date of Patent: May 25, 2021

(54) SELF-ENGAGING MOUNTING METHOD FOR WALL PANELS

(71) Applicant: InPro Corporation, Muskego, WI (US)

(72) Inventors: David R. Gebhardt, Milwaukee, WI (US); Matthew G. Bennett, New Berlin, WI (US)

(73) Assignee: InPro Corporation, Muskego, WI (US)

( * ) Notice: Subject to any disclaimer, the term of this patent is extended or adjusted under 35 U.S.C. 154(b) by 0 days.

(21) Appl. No.: 16/163,223

(22) Filed: Oct. 17, 2018

(65) Prior Publication Data
US 2019/0112819 A1  Apr. 18, 2019

Related U.S. Application Data

(60) Provisional application No. 62/573,394, filed on Oct. 17, 2017.

(51) Int. Cl.
*E04F 13/08* (2006.01)
*F16B 43/00* (2006.01)

(52) U.S. Cl.
CPC ...... *E04F 13/0832* (2013.01); *E04F 13/0839* (2013.01); *E04F 13/0882* (2013.01); *E04F 13/0885* (2013.01); *F16B 43/00* (2013.01)

(58) Field of Classification Search
CPC .............. E04F 13/0832; E04F 13/0882; E04F 13/0839; E04F 13/0885; F16B 43/00
See application file for complete search history.

(56) References Cited

U.S. PATENT DOCUMENTS

| 3,961,453 | A | * | 6/1976 | Couwenbergs | E04D 11/005 52/509 |
|---|---|---|---|---|---|
| 5,577,696 | A | * | 11/1996 | Kramer | G08B 17/10 248/206.5 |
| 5,628,587 | A | * | 5/1997 | Lesslie | E21D 21/0086 405/302.1 |
| 7,109,874 | B2 | * | 9/2006 | Pilkington | G08B 17/10 340/628 |
| 7,336,165 | B2 | * | 2/2008 | Fuchs | G08B 17/10 340/506 |
| 9,091,388 | B2 | * | 7/2015 | Zribi | F16M 13/02 |
| 9,518,395 | B2 | | 12/2016 | Kuijper | |

(Continued)

FOREIGN PATENT DOCUMENTS

DE  102015204772 B3 * 7/2016 ........... G08B 17/113

OTHER PUBLICATIONS

Monarch Metal Fabrication, Easy Panel System Installation Instructions, known prior to Oct. 17, 2017, 7 pages.
(Continued)

*Primary Examiner* — Basil S Katcheves
*Assistant Examiner* — Omar F Hijaz
(74) *Attorney, Agent, or Firm* — Reinhart Boerner Van Deuren s.c.

(57) ABSTRACT

A wall panel installation method, assembly, system and kit are provided. The wall panel is installed and held to an existing building structure with the combination of a support plate secured to the building wall, fastening elements adhered to the wall panel and corresponding fastening elements adhered to respective support plates. When the wall panel is in position, the fastening elements are brought into contact to engage each other and hold the wall panel in position relative to the building structure/wall.

11 Claims, 15 Drawing Sheets

(56) References Cited

U.S. PATENT DOCUMENTS

| | | | | |
|---|---|---|---|---|
| 9,945,414 | B1* | 4/2018 | Rodenhouse | F16B 43/001 |
| 2004/0031902 | A1* | 2/2004 | Davis, Jr. | F16M 7/00 |
| | | | | 248/519 |
| 2005/0045784 | A1* | 3/2005 | Pitlor | H02G 3/20 |
| | | | | 248/206.5 |
| 2012/0001042 | A1* | 1/2012 | Zhong | G09F 7/12 |
| | | | | 248/222.14 |
| 2017/0227034 | A1* | 8/2017 | Jordan | F16B 5/0258 |

OTHER PUBLICATIONS

CS Acrovyn, Sure Snap Wrapped Square Edge Product Data, 2017, 2 pages.

* cited by examiner

SELF-ENGAGING MOUNTING METHOD FOR WALL PANELS

CROSS-REFERENCE TO RELATED PATENT APPLICATION

This patent application claims the benefit of U.S. Provisional Patent Application No. 62/573,394, filed Oct. 17, 2017, the entire teachings and disclosure of which are incorporated herein by reference thereto.

BACKGROUND OF THE INVENTION

The present invention relates to a system for attaching wall panels to preexisting building structures such as existing walls having, for example, drywall substrate or plastered substrates supported by wall studs (e.g. metal or wood). In particular, the present invention relates to an interface for providing attachment points between a wall panel and the existing wall which permits attachment of the panels to existing walls via the interface and also permits the wall panels to be accurately positioned or re-positioned without changing the location of attachment points on the existing building walls.

SUMMARY OF THE INVENTION

According to one aspect, embodiments of a wall panel kit for covering an existing building surface are provided. The kit includes a wall panel, at least one first self-engaging mounting element, at least one second self-engaging mounting element, and at least one mounting plate. Each of the first self-engaging mounting element has a first side and a second side, and the first side is configured to attach to the wall panel. Each of the second self-engaging mounting element has a third side, a fourth side, a first thickness between the third side and the fourth side, and an aperture through the first thickness. Each third side is configured to reversibly engage a corresponding second side of the first self-engaging mounting element. Further, each of the mounting plate has a first surface, a second surface, a second thickness between the first surface and the second surface, and an opening through the second thickness. Each fourth side of the second self-engaging mounting element is configured to attach to a corresponding first surface of the mounting plate. Each second surface further includes a first collar surrounding the opening, a peripheral rib, and a plurality of radial ribs extending from the first collar to the peripheral rib. A fastener may be passed through each opening to engage the existing building surface and hold each mounting plate in engagement with the building surface such that the wall panel is reversibly engaged with the existing building surface by the interaction of each first self-engaging mounting element with a corresponding second self-engaging mounting element.

According to another aspect, embodiments of a mounting plate are provided. The mounting plate includes a reinforcing surface and a smooth surface opposite the reinforcing surface. The mounting plate further includes an opening extending between the reinforcing surface and the smooth surface. Also, the mounting plate includes a first collar surrounding the opening and extending from the reinforcing surface, a peripheral rib extending from the reinforcing surface, and a plurality of radial ribs extending from the first collar to the peripheral rib.

According to a further aspect, embodiments the present disclosure relate to a method for fastening a wall panel to an existing building surface. In the method, a plurality of first self-engaging mounting elements is attached at a plurality of locations on the wall panel. A plurality of rigid mounting plates is fastened to a plurality of corresponding locations on the existing building surface. A second self-engaging mounting element is attached to each of the plurality of rigid mounting plates. Further, the wall panel is joined to the existing building surface by reversibly engaging each of the first self-engaging mounting elements at the plurality of locations on the wall panel with the second self-engaging mounting element attached to one of the plurality of rigid mounting plates located at the plurality of corresponding locations on the existing building surface.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

This application will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
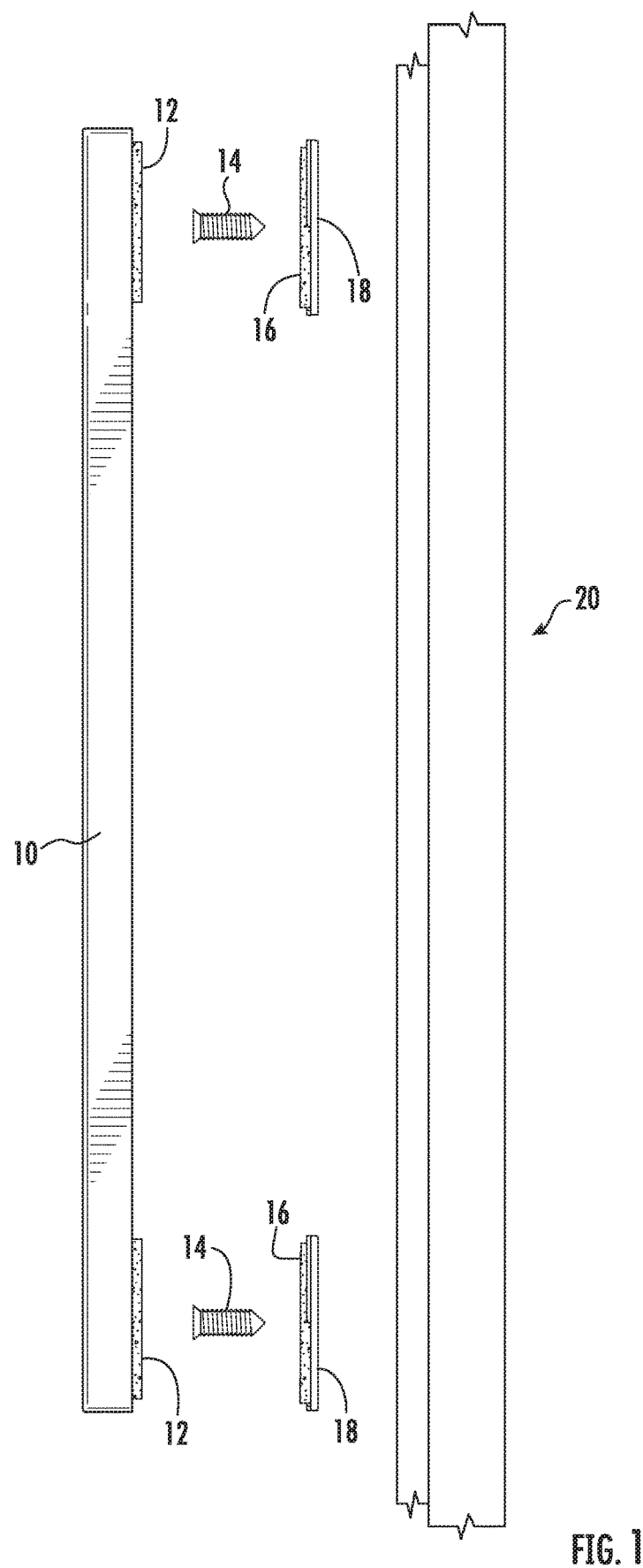
FIG. 1 is an exploded side view of wall panel mounting arrangement according to one embodiment of the invention.
Figure 2:
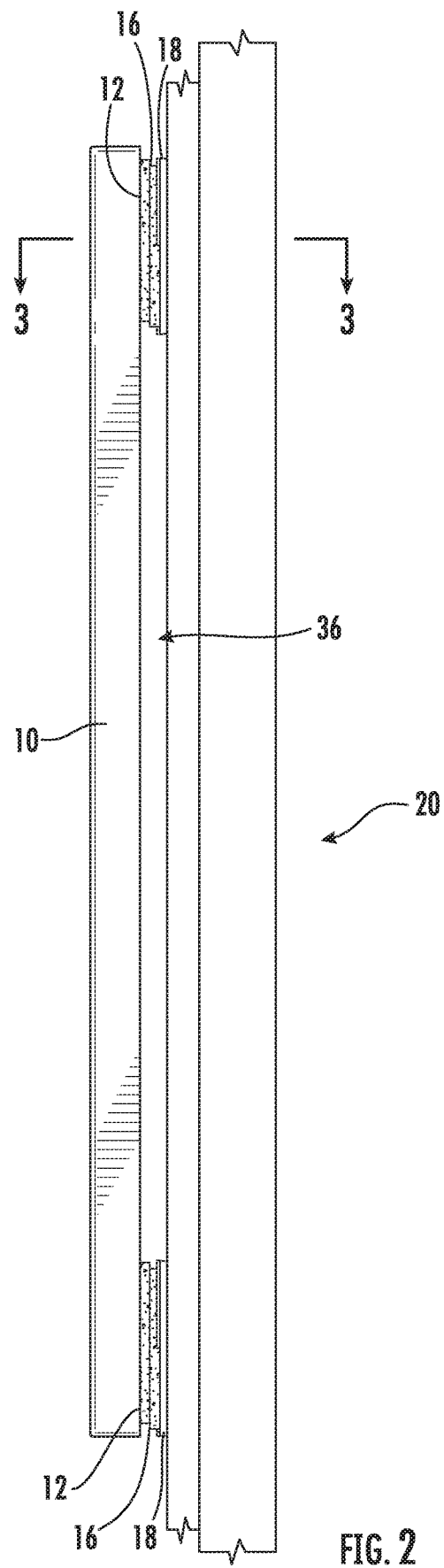
FIG. 2 is a side view of the arrangement with the wall panel fastened to a building surface/wall.

Referring to FIG. 1, this exploded view is of a wall panel kit which can be assembled as shown in FIG. 2. The kit includes a wall panel 10, a self-engaging mounting element 12, a fastener 14, a self-engaging mounting element 16, a mounting plate 18 and structure/wall 20. The wall panel may be fabricated from a range of materials and compositions. One specific example of a wall panel is a vinyl wall panel of the type marketed by InPro Corporation (Muskego, Wis.). An example of the self-engaging mounting element 12 material is a touch fastener (e.g., 3M™ Dual Lock™ Reclosable Fasteners, Velcro® fasteners, hook-and-loop fasteners, etc.) which is adhered to its respective wall panel 10 or mounting plate 18. Fastener 14 may be a tapered head wood or drywall screw. Depending upon the construction of the associated building wall 20 may be of the type constructed from wood or metal studs/framing to which drywall is attached in place through the use of mechanical fasteners or adhesives. In many situations, concrete board, plywood, or plastered board may be used in place of the drywall. Walls 20 are also, typically, constructed from concrete block. Alternatively, wall 20 may be a temporary or movable wall, such as a point of sale system or trade show booth wall.

Figure 3:
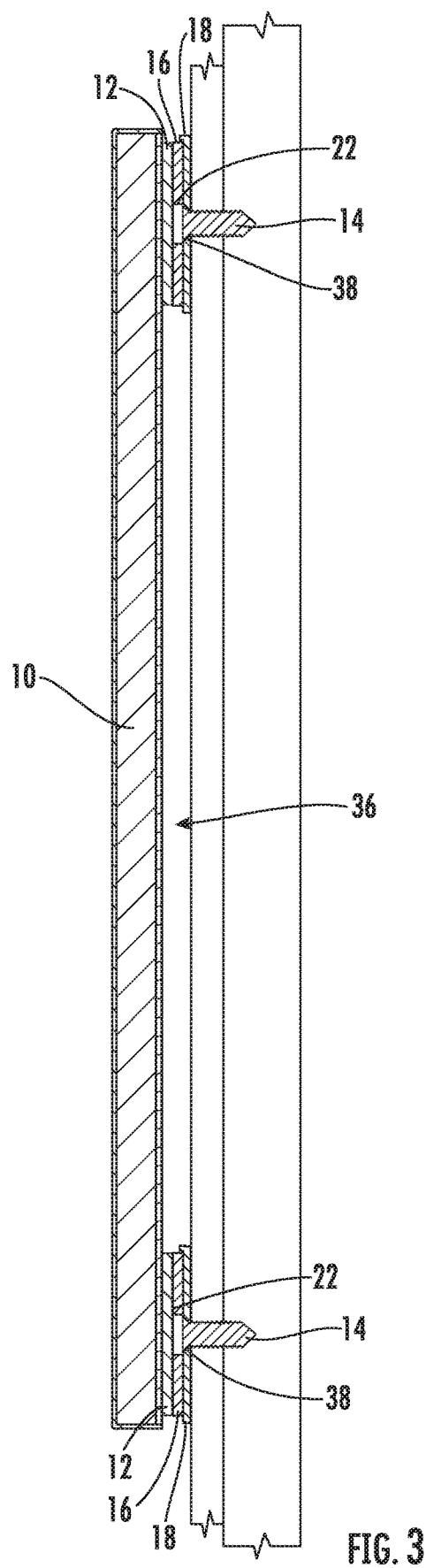
FIG. 3 is a section view taken along line 3-3 of FIG. 2.

FIGS. 2 and 3 illustrate the manner in which the wall panel 10, self-engaging mounting element 12, fastener 14, self-engaging mounting element 16, mounting plate 18, and wall 20 interact to hold a wall panel 10 in position relative to building wall 20. In particular, self-engaging mounting element 12 is adhered on the non-self-engaging side to panel 10, pad 16 is adhered on its non-self-engaging side to mounting plate 18, and mounting plate 18 is fastened to wall 20 with fastener 14. The engagement and interaction of self-engaging surface of elements 12, 16 hold the wall panel 10 in place. In embodiments, the engagement between the self-engaging mounting elements 12, 16 is sufficient such that each mounting plate 18 can hold at least 10 lbs. Thus, the number of mounting plates 18 and self-engaging mounting elements 18 may vary based on the weight of the wall panel 10. Further, as can be appreciated, the size of the self-engaging mounting elements 12, 16 determines the range within the wall panel can be located and still permit an appropriate holding force between elements 12, 16. Larger self-engaging mounting elements 12, 16 permit a larger misalignment between elements 12, 16 when a panel 10 is in place. Additionally larger sized elements 12, 16, make installation easier by providing room for slop, or if the installer/contractor decides to switch similar size panels, the mounting plates 18 may not need to be relocated. Additionally, the use of a fastener 14 such as a screw instead of an adhesive allows the mounting plate 18 to be securely fastened to a surface without surface preparation (e.g. cleaning, panting, priming, etc.).

Figure 4:
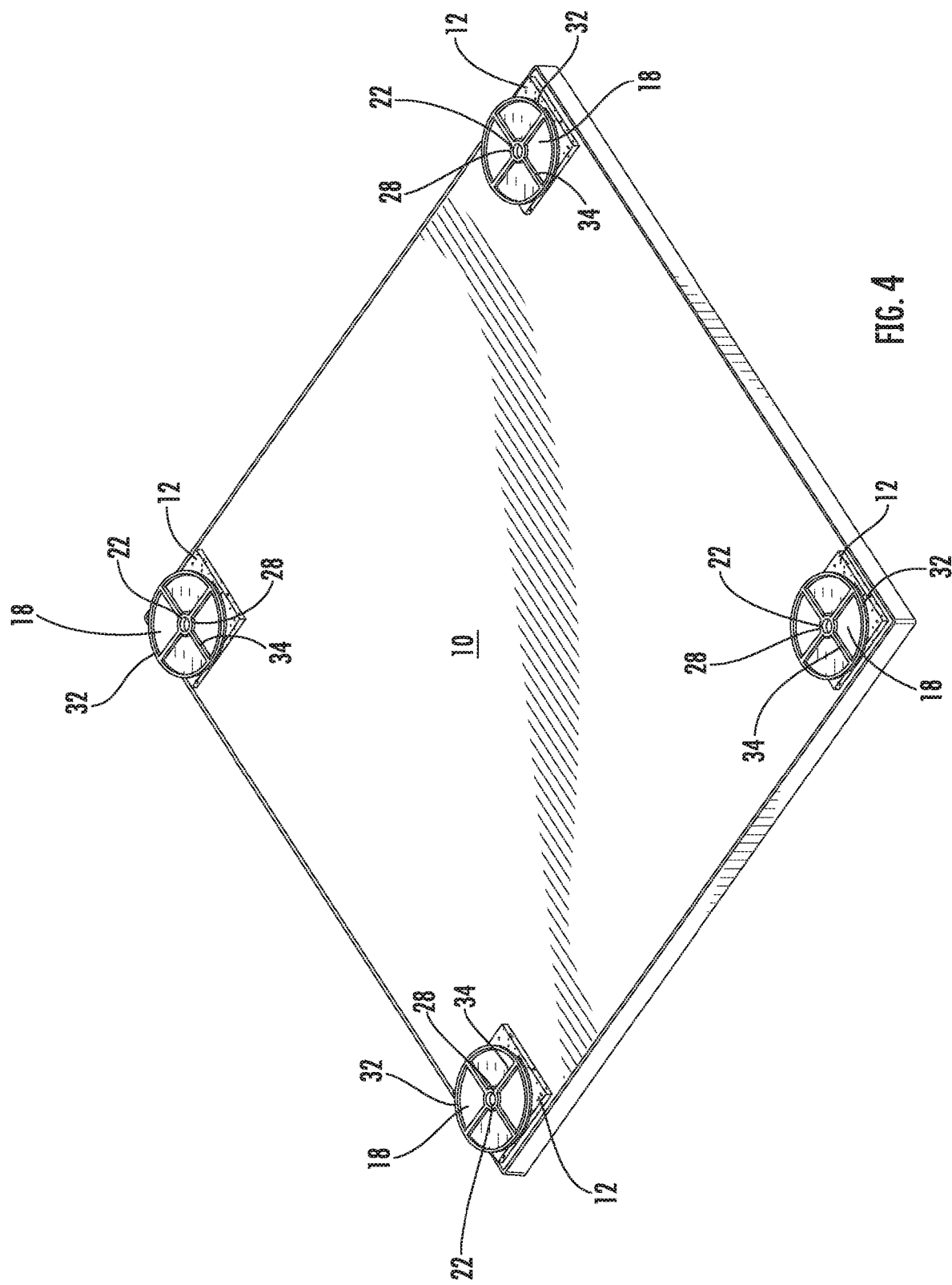
FIG. 4 is a perspective view of a wall panel engaged with 4 fastening arrangements.

Referring to FIG. 4, by way of further illustration, a wall panel 10 is shown adhered to self-engaging mounting elements 12 at all four corners. The self-engaging mounting elements 12 are engaged with self-engaging mounting elements 16 and associated mounting plates 18. Note, however, for some applications, such as wrapping a flexible panel 10 around a curved building wall 20, additional holding strength may require a higher density of self-engaging mounting elements 12, 16. Also, self-engaging mounting elements 12, 16 may be used in one or more inner wall panel 10 locations to provide support for the wall panel 10 when pushed toward building wall 20.

Referring now to FIGS. 5-11, an embodiment of the combination of the self-engaging mounting element 16 and mounting plate 18 are shown in detail. When mounting plate 18 is fabricated to have a circular shape it may be referred to as a disc or button. As shown in FIGS. 5-11, the mounting plate 18 includes a circular shape. In a preferred embodiment, the mounting plate 18 is injected molded from an appropriate plastic in the shape shown in the FIGS. 5-11.

Figure 5:
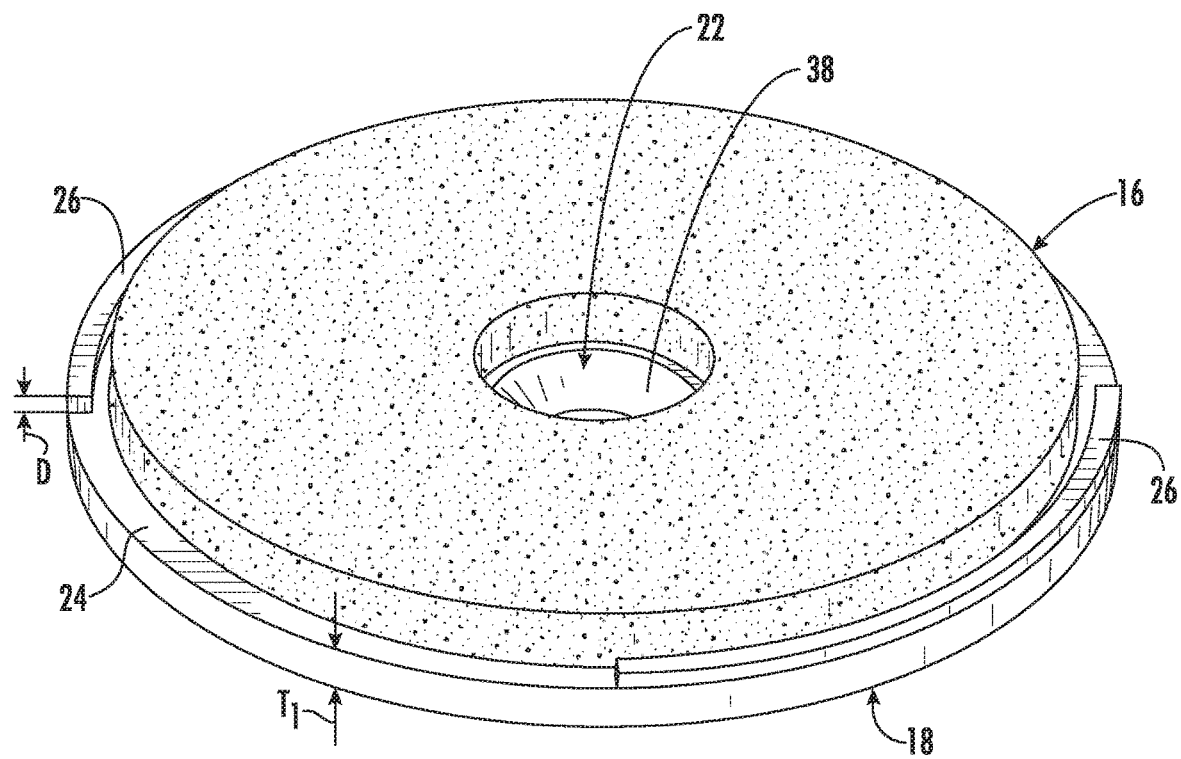
FIG. 5 is a top view of one embodiment of the reinforced fastening pad support button/plate.
Figure 6:
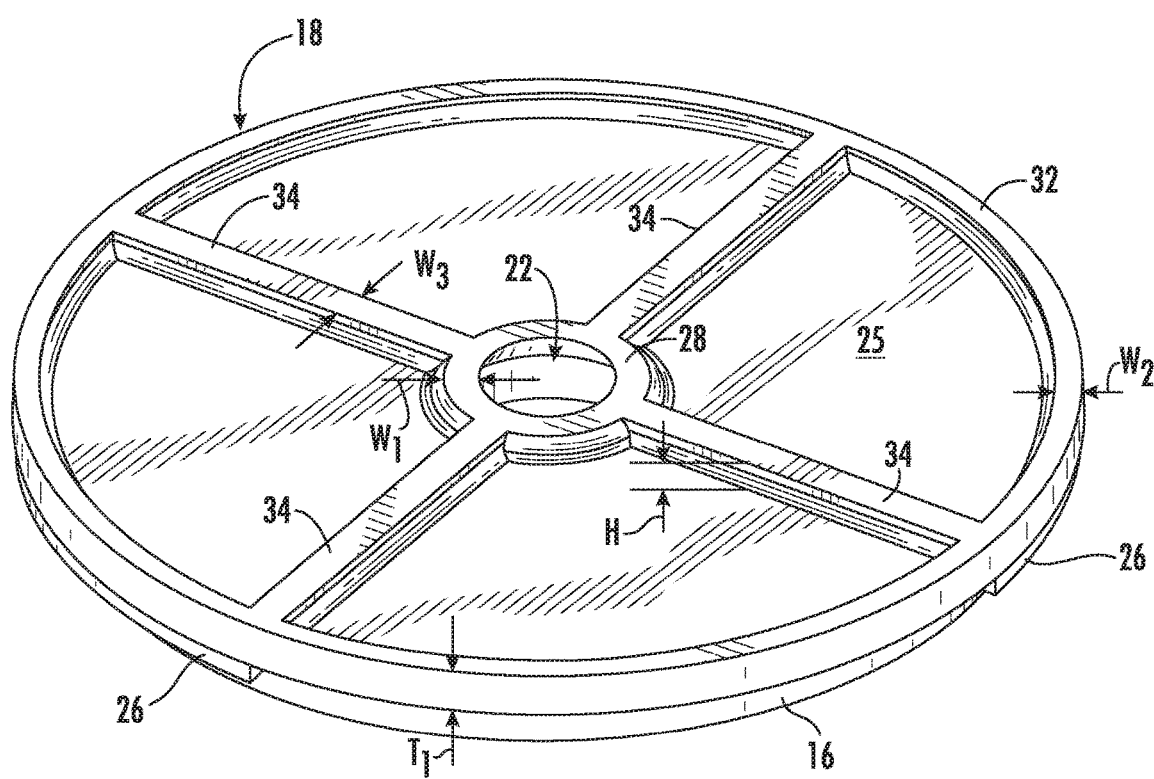
FIG. 6 is a bottom view of the plate.

With reference to FIGS. 5 and 6, the mounting plate 18 includes an opening 22 formed through a thickness $T_1$ of the mounting plate defined by a first smooth surface 24 (shown in FIG. 5) and a second, reinforcement surface 25 (shown in FIG. 6). In embodiments, the thickness $T_1$ of the mounting plate 18 is from 1.5 mm to 2.0 mm (e.g., about 1.8 mm). Referring now to FIG. 5, peripheral alignment ridges 26 extend from the smooth surface 24. In the embodiment depicted, two peripheral alignment ridges 26 extend from the smooth surface 24, but in other embodiments, a single alignment ridge 26 or more than two alignment ridges 26 may be provided. In that regard, depending upon the application and molding capability, the alignment ridges 26 may be a continuous, peripheral ridge 26 or numerous peripheral features. The alignment ridges 26 act as an alignment device for self-engaging mounting element 16 and facilitate alignment of the self-engaging mounting element 16 with the smooth surface 24 when the self-engaging mounting element 16 is adhered to the smooth surface 24.

In embodiments, the self-engaging mounting element 16 is also circular, but in embodiments, the self-engaging mounting element 16 is shaped to match the shape of the mounting plate 18. As can be seen in FIG. 5, the self-engaging mounting element 16 includes a centrally located aperture 27. In a preferred embodiment, the self-engaging mounting element 16 is fabricated from a touch fastener material. In a particularly preferred embodiment, the self-engaging mounting element 16 is fabricated from 3M™ Dual Lock™ Reclosable fastener material. In other preferred embodiments, the self-engaging mounting element 16 is fabricated from Velcro® material or another hook-and-loop fastener material.

Figure 7:
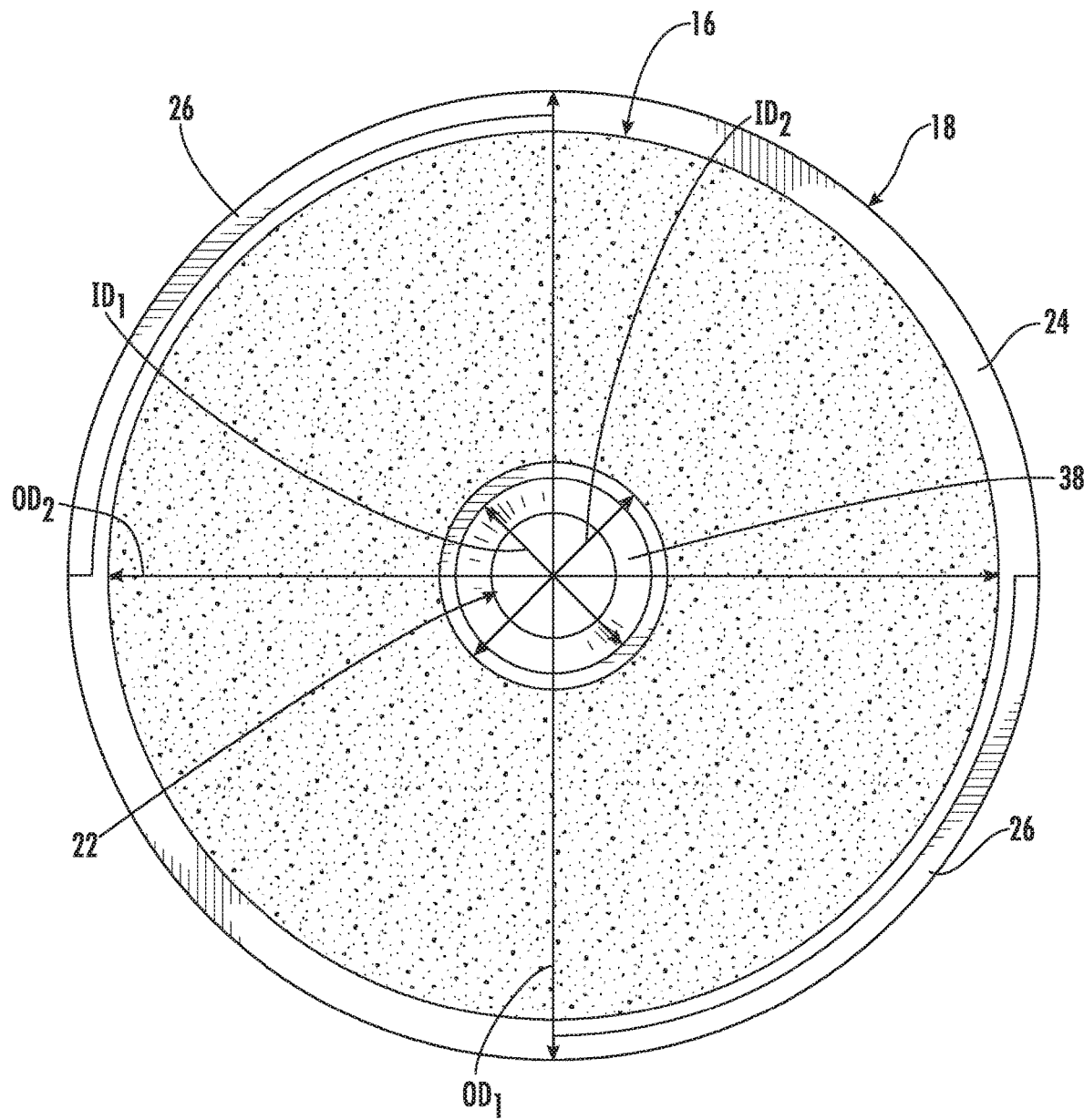
FIG. 7 is a top view of the plate.

As shown in FIG. 7, the outer diameter of the self-engaging mounting element 16 is smaller than the outer diameter of the mounting plate 18 such that the entire self-engaging mounting element 16 is contained on smooth surface 24. In embodiments, the circular shape of the mounting plate 18 has an outer diameter $OD_1$ of from 30 mm to 50 mm. In other embodiments, the circular shape of the mounting plate 18 has an outer diameter $OD_1$ of from 35 mm to 45 mm, and in a specific embodiment, the circular shape of the mounting plate 18 has an outer diameter $OD_1$ of about 41.3 mm. In embodiments, the circular shape of the self-engaging mounting element 16 has an outer diameter $OD_2$ of from 27 mm to 47 mm. In other embodiments, the circular shape of the self-engaging mounting element 16 has an outer diameter $OD_2$ of from 32 mm to 42 mm, and in a specific embodiment, the circular shape of the self-engaging mounting element 16 has an outer diameter $OD_2$ of about 38.1 mm.

Further, the self-engaging mounting element 16 is positioned such that aperture 27 aligns with opening 22 and such that the self-engaging mounting element 16 is between the alignment ridges 26. The self-engaging mounting element 16 may, in embodiments, be sized so as to be snugly against the alignment ridges 26 and/or the circumference of the opening 22, or the self-engaging mounting element may be sized such that a space is provided between the alignment ridges 26 and/or circumference of the opening 22 as shown in FIG. 7. For example, in an embodiment, the opening 22 has a diameter $ID_1$ on the smooth surface 24 of from 5.5 to 8 mm, e.g., about 7.5 mm, and the aperture 27 has a diameter $ID_2$ of from 7.5 mm to 10 mm, e.g., about 9.5 mm.

Figure 8:
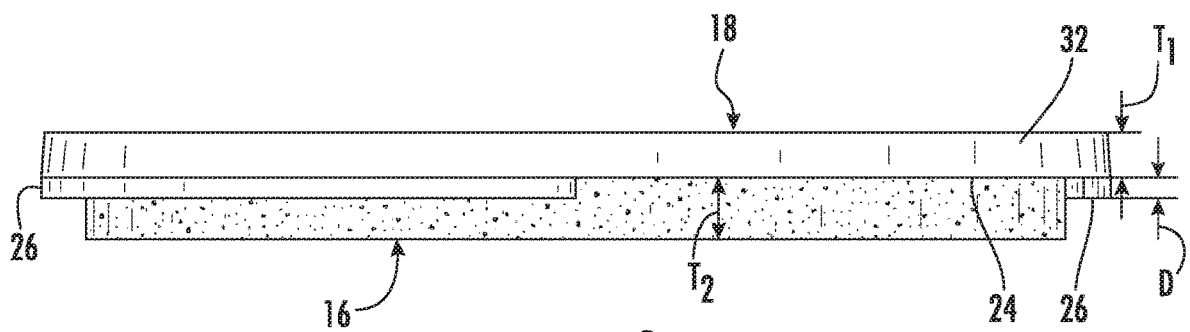
FIG. 8 is a side view of the plate.
Figure 9:
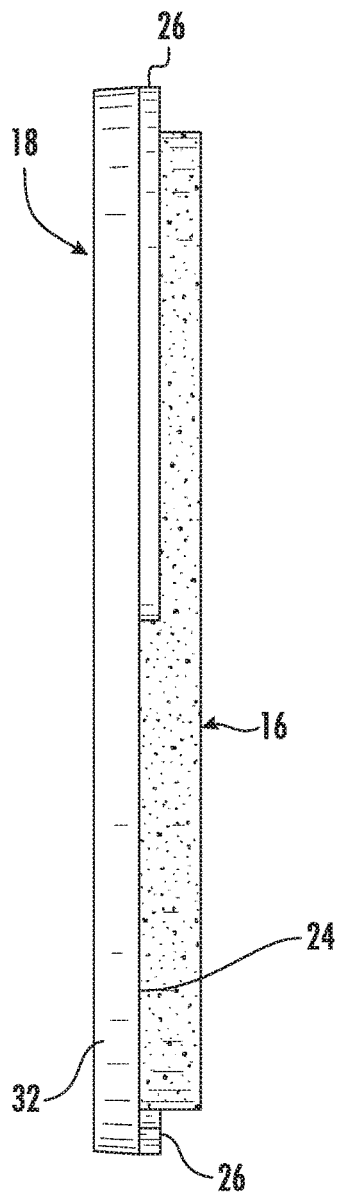
FIG. 9 is a side view of the plate.

Referring now to FIG. 8, a side view of the mounting plate 18 and self-engaging mounting element 16 can be seen. In the embodiment depicted, the alignment ridge 26 extends from the smooth surface 24 a first distance that is less than the thickness of the self-engaging mounting element 16. That is, the self-engaging mounting element 16 protrudes from the smooth surface 24 a farther distance than do the alignment ridges 26. In embodiments, the alignment ridges 26 extend to no more than 75% of the thickness $T_2$ of the self-engaging mounting element 16. In other embodiments, the alignment ridges 26 extend to no more than 60% of the thickness $T_2$ of the self-engaging mounting element 16, and in still other embodiments, the alignment ridges 26 extend to no more than 50% of the thickness $T_2$ of the self-engaging mounting element 16. In embodiments, the thickness $T_2$ of the self-engaging mounting element 16 is from 2 mm to 3 mm (e.g., about 2.35 mm). FIG. 9 depicts an opposite side view of the mounting plate 18 and self-engaging mounting element 16. As can be seen there, the other of the two depicted alignment ridges 26 extends in a similar manner as the alignment ridge 26 depicted in FIG. 8. In embodiments, each of the alignment ridges 26 may extend a distance from the smooth surface 24 that is different than the distance of at least one other alignment ridge 26. However, in embodiments, no alignment ridge 26 extends a distance more than the 75%, 60%, or 50% of the thickness of the self-engaging mounting element 16. In embodiments, the alignment ridges 26 extend a distance of from 0.5 mm to 1 mm (e.g., about 0.8 mm) from the smooth surface 24.

Returning to FIG. 6, the reinforcing surface 25 is configured to include reinforcement structures which limit deflection and/or breakage of the mounting plate 18 when self-engaging mounting elements 12, 16 are separated, e.g., such as when a wall panel 10 is removed from a wall 20 (shown, e.g., in FIG. 2).

Figure 10:
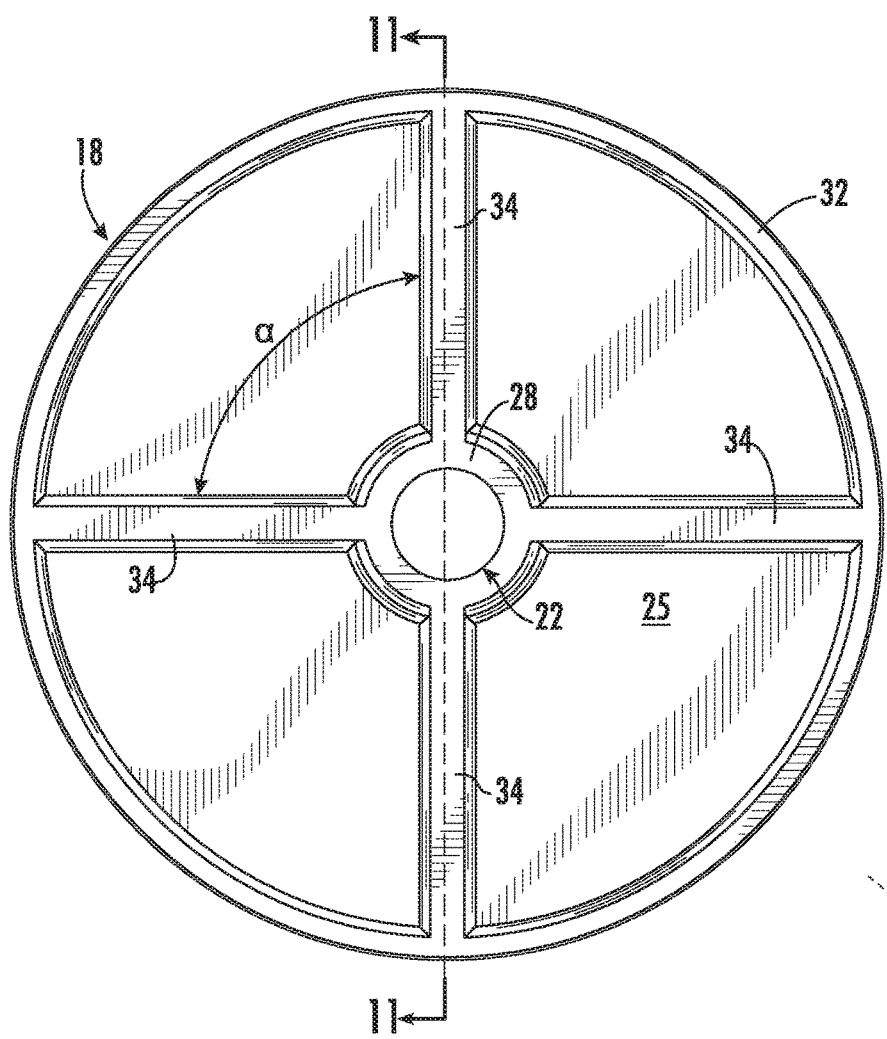
FIG. 10 is a side view of the plate taken 90 degrees from the view in FIG. 8.

In a preferred embodiment, the mounting plate 18 is molded with a collar 28 surrounding the opening 22. In embodiments, the collar 28 has a width $W_1$ of from 2.5 mm to 5 mm (e.g., about 3.5 mm). The mounting plate 18 also includes an integrally molded peripheral rib 32 located at the periphery of surface 25. In embodiments, the peripheral rib 32 has a width $W_2$ of from 0.75 mm to 1.25 mm (e.g., about 1.0 mm). A number of radial ribs 34 extend outwardly from the collar 28 to the peripheral rib 32. In the embodiment depicted, the surface 25 includes four radial ribs 34; however, in other embodiments, the surface 25 includes from two radial ribs 34 to sixteen radial ribs 34. In embodiments, each of the radial ribs 34 has a width $W_3$ of from 1 mm to 2 mm (e.g., about 1.5 mm). Further, in embodiments, the collar 28, peripheral rib 32, and the radial ribs 34 have a height H of from 0.5 mm to 1.5 mm (e.g., about 0.8 mm). As can be seen in the embodiment of FIG. 10, the radial ribs 34 are equidistantly spaced around the collar 28. That is, an angle α formed between any two adjacent radial ribs 34 is substantially the same as the angle α between any two other adjacent radial ribs 34. In other embodiments, the radial ribs 34 are not equidistantly spaced, such that the angle α between a first set of two adjacent radial ribs 34 is different than the angle α between at least one other set of two adjacent radial ribs 34. The combination of the collar 28, peripheral rib 32, and radial ribs 34 rigidify and strengthen the mounting plate 18. The collar 28, peripheral rib 32, and radial ribs 34 also provide a thickness to the mounting plate 18. In embodiments, the thickness can be varied to optimize the strength of plate 18 and/or, as shown in FIG. 2, to select a separation distance or gap 36 between installed panels 10 and associated walls 20. Controlling or selecting gap 36 allows for accommodation of wavy walls 20 or for accommodation of items located on the walls e.g. LED light strips, finish strips, panel reveals, etc.

Figure 11:
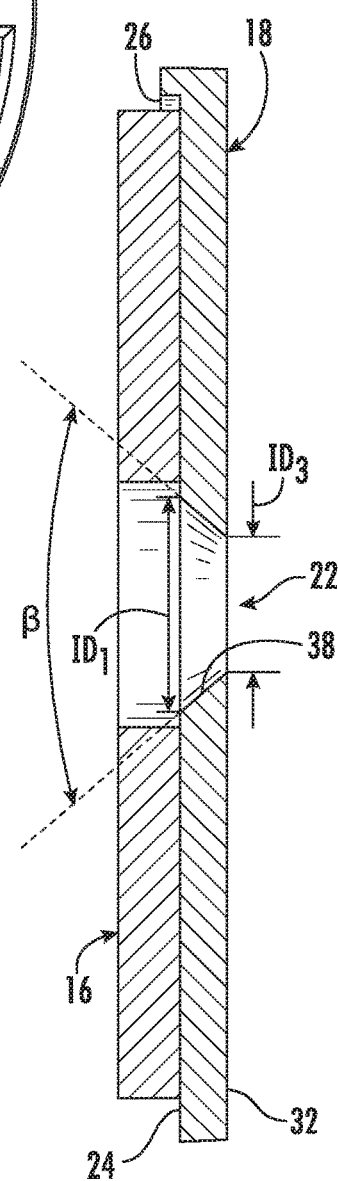
FIG. 11 is a section view along line 11-11 in FIG. 10.

FIG. 11 depicts a cross-section of the mounting plate 18 and the self-engaging mounting element 16. As can be seen in FIG. 11, in embodiments, the opening 22 defines a frustoconical surface 38 such that the diameter $ID_1$ of the opening 22 at the smooth surface 24 is greater than the diameter $ID_3$ of the opening 22 at the reinforcing surface 25. The diameter $ID_1$ is provided above, and in embodiments the diameter $ID_3$ is from 3.5 mm to 7.5 mm (e.g., about 5.3 mm). The frustoconical surface 38 of the opening 22 tapers from the smooth surface 24 to the reinforcing surface 25. In embodiments, the opening 22 defines an angle β of from 70° to 100°. In other embodiments, the opening 22 defines an angle β of from 80° to 90°, and in a specific embodiment, the opening 22 defines an angle β of about 82°. An opening as described and as shown in FIG. 11 can be used to eliminate interference between the self-engaging mounting elements 12, 16 by providing a recess to accommodate the head of the fastener 14, e.g., the head of a wood screw, a drywall screw, or another countersunk screw. In other embodiments, the recess may also take the form of a stepped surface in which the recess has a uniform diameter which accommodates a fastener 14, such as a nail or bolt head.

FIGS. 12-17 depict another embodiment of a mounting plate 118. In function and manner of attachment to a wall panel 10 and wall structure 20, the mounting plate 118 is similar to the mounting plate 18 of FIGS. 1-11. In particular, the above discussion of mounting plate 18 with respect to attachment to the wall/structure 20 depicted in FIGS. 1-4 entirely or substantially applies to the mounting plate 118 of FIGS. 12-17.

Figure 12:
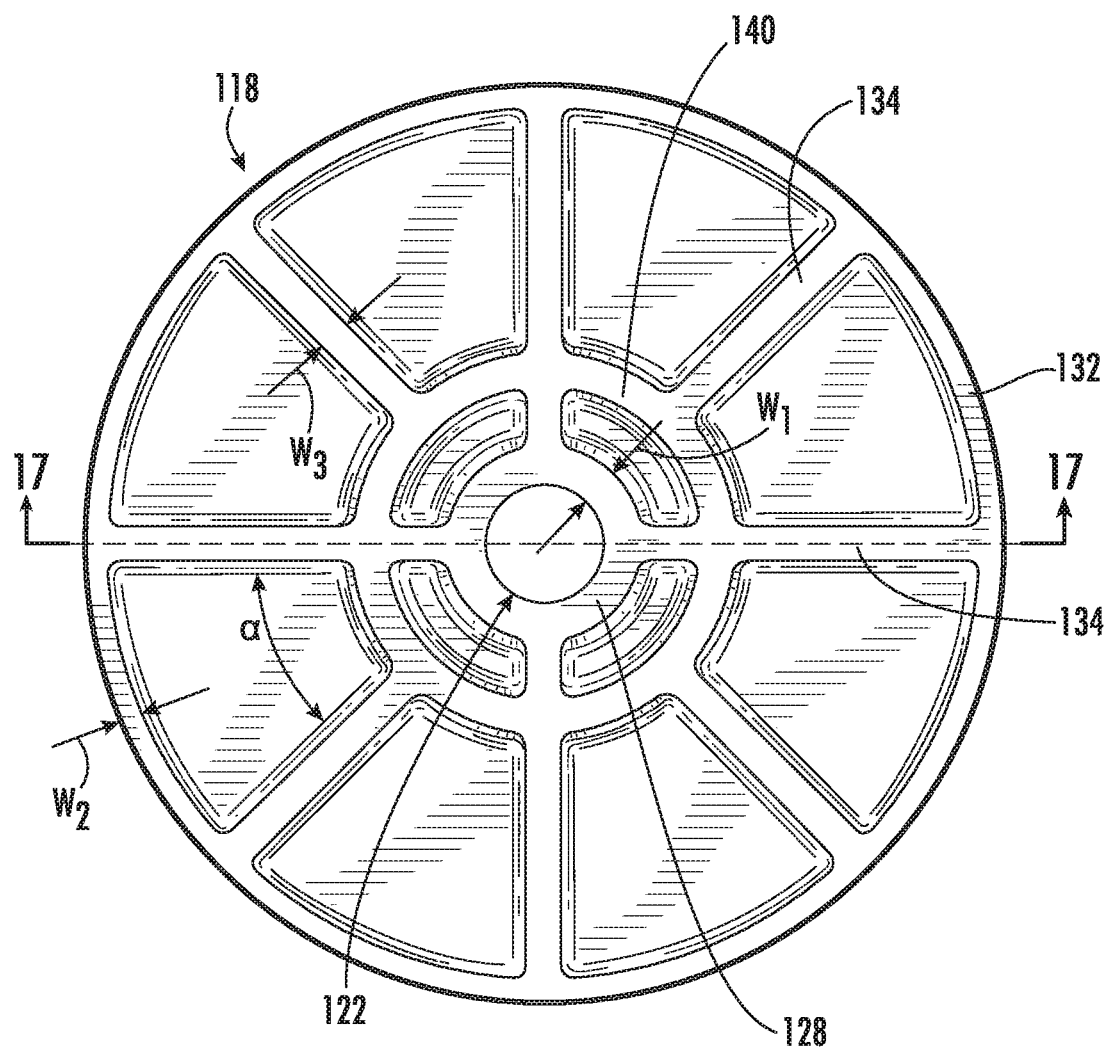
FIG. 12 is a mounting plate according another embodiment of the invention.

Referring to FIG. 12, a mounting plate 118 according to a second embodiment is depicted. As shown in FIG. 12, the mounting plate 118 includes a circular shape. In a preferred embodiment, the mounting plate 118 is injection molded from an appropriate plastic in the shape shown in the FIG. 12. As can be seen, a reinforcing surface 125 of the mounting plate 118 includes many of the same features as the mounting plate 18, including a first collar 128 surrounding an opening 122, a peripheral rib 132, and a plurality of radial ribs 134. The mounting plate 118 further includes a second collar 140 that encircles the first collar 128. Additionally, the embodiment of the mounting plate 118 depicted in FIG. 12 includes eight radial ribs 134 that extend between the first collar 128 and the peripheral rib 132, including through the second collar 140.

In embodiments, the first collar 128 and/or second collar 140 has a width $W_1$ of from 2.5 mm to 5 mm (e.g., about 3.5 mm). In embodiments, the peripheral rib 132 has a width $W_2$ of from 0.5 mm to 1.5 mm (e.g., about 1.0 mm). In embodiments, each of the radial ribs 134 has a width $W_3$ of from 1 mm to 2 mm (e.g., about 1.5 mm). Further, in embodiments, the first collar 128, the second collar 140, the peripheral rib 132, and the radial ribs 134 have a height H (shown in FIG. 13) of from 0.5 mm to 1.5 mm (e.g., about 0.8 mm). As can be seen in the embodiment of FIG. 12, the radial ribs 134 are equidistantly spaced around the collars 128, 140. That is, an angle α formed between any two adjacent radial ribs 134 is substantially the same as the angle α between any two other adjacent radial ribs 134. In other embodiments, the radial ribs 134 are not equidistantly spaced, such that the angle α between a first set of two adjacent radial ribs 134 is different than the angle α between at least one other set of two adjacent radial ribs 134. As with the previous embodiments, the combination of the collars 128, 140, peripheral rib 132, and radial ribs 134 rigidify and strengthen the mounting plate 118.

Figure 13:
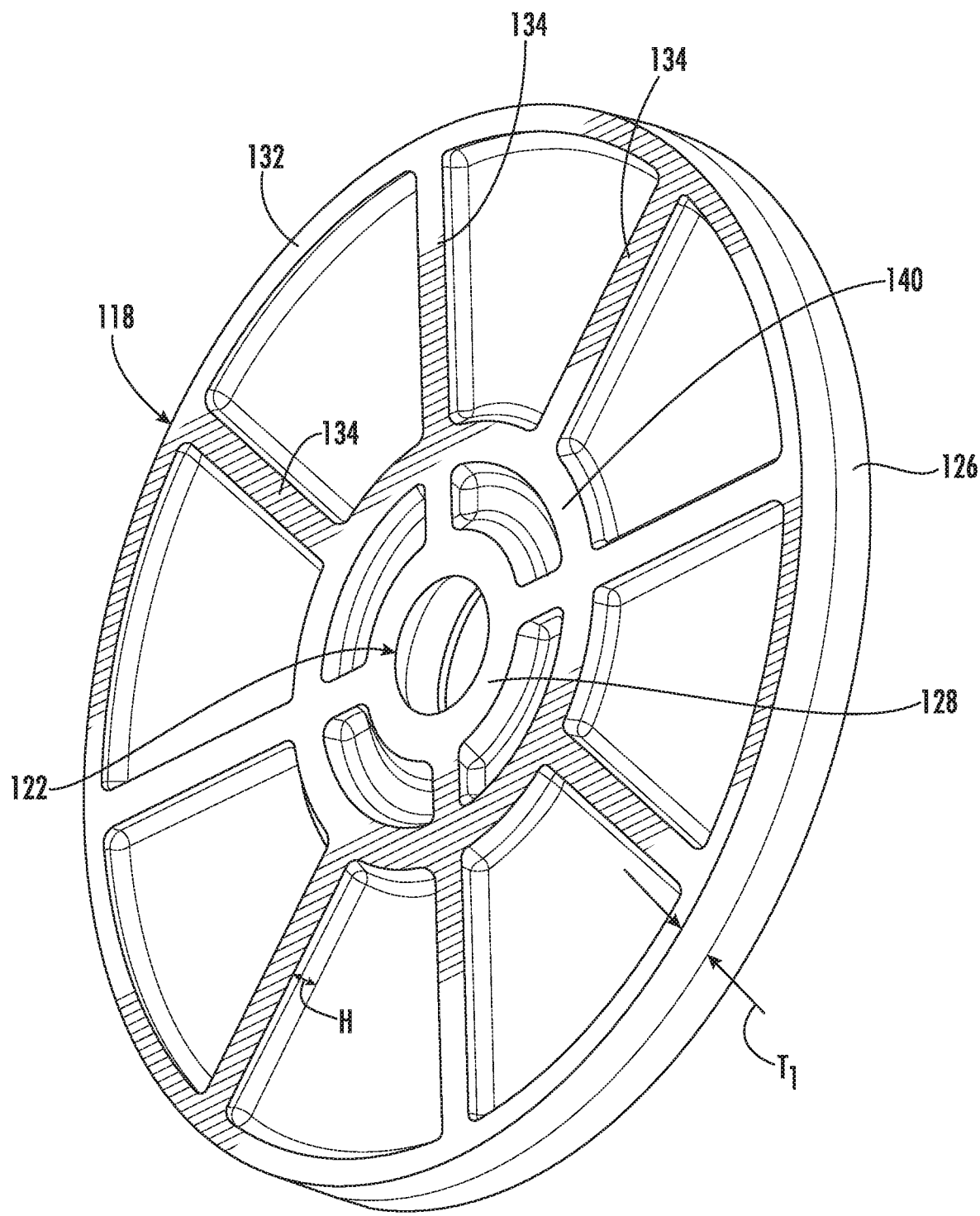
FIG. 13 is a perspective view of the mounting plate of FIG. 12.

As shown in FIG. 13, the collars 128, 140, peripheral rib 132, and radial ribs 134 also provide a thickness $T_1$ to the mounting plate 118. In embodiments, the thickness $T_1$ of the mounting plate 118 is from 1.5 mm to 2.0 mm (e.g., about 1.8 mm) as measured from the plane defined by the highest reinforcing feature (collars 128, 140, peripheral rib 132, and/or radial ribs 134) to the plane of the smooth surface 124 (as shown, e.g., in FIG. 14). In this particular embodiment of the mounting plate 118, the additional radial ribs 134 and second collar 140 increase the amount of surface area in contact with the structure/wall 20. In this way, driving the fastener 14 into the structure/wall 20 through the opening 122 does not cause cupping in the structure/wall 20.

Figure 14:
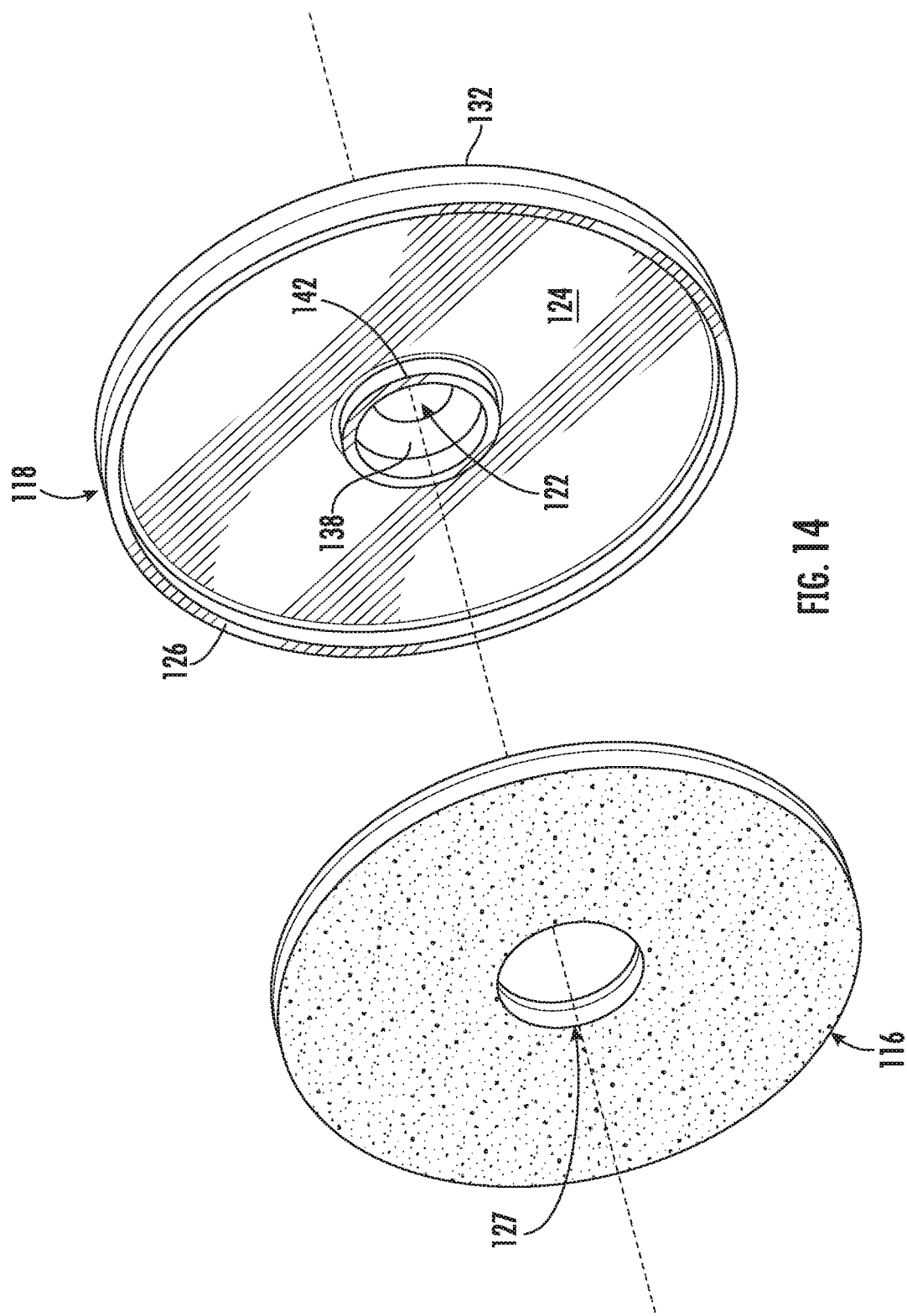
FIG. 14 is an exploded front perspective view of the mounting plate showing the self-engaging mounting element.
Figure 15:
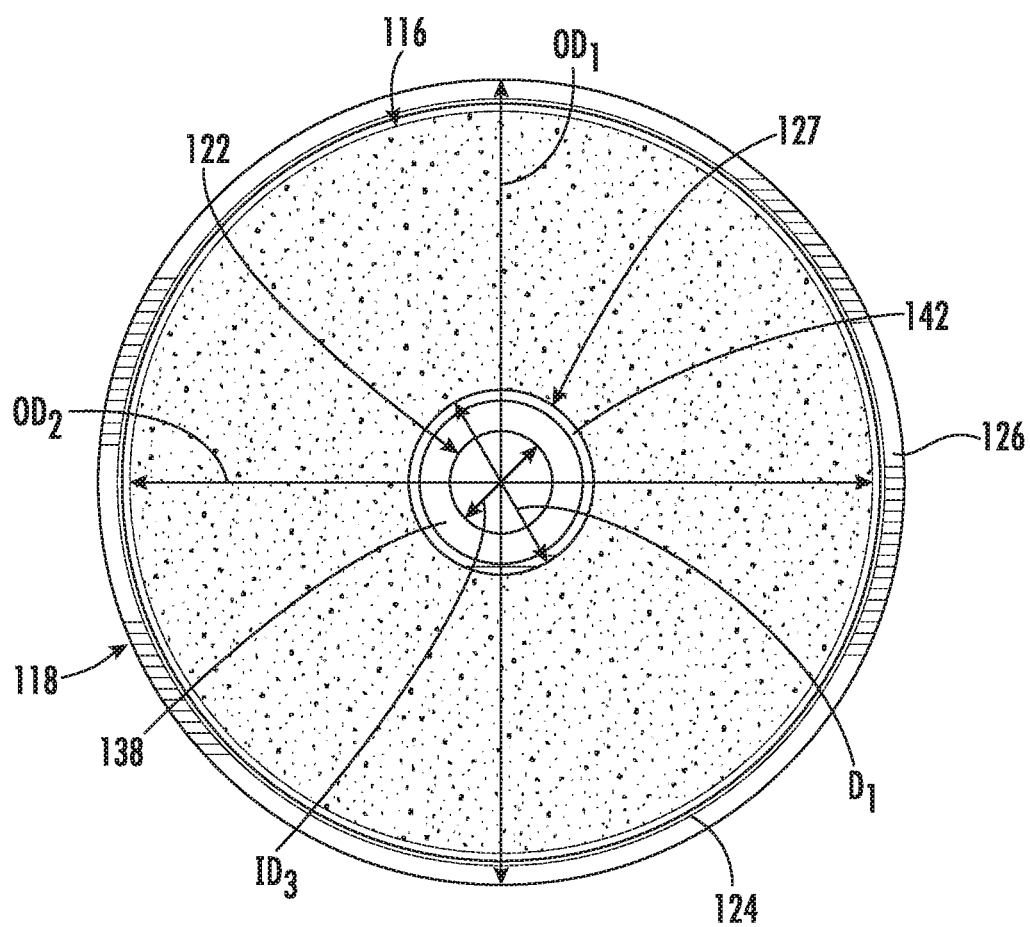
FIG. 15 is a top view of the mounting plate and self-engaging mounting element.

FIG. 14 shows the reverse side of the mounting plate 118 and the self-engaging mounting element 116 in exploded view. The self-engaging mounting element 116 includes a centrally located aperture 127 aligned with the opening 122 of the mounting plate 118. As shown in FIG. 15, in embodiments, the aperture 127 has a diameter $D_1$ of from 7.5 mm to 12.5 mm (e.g., about 10.3 mm). More particularly, the aperture 127 is located around a central alignment ridge 142 extends from smooth surface 124. In embodiments, the central alignment ridge 142 has an outer diameter that is about the same as diameter $D_1$. Further, a continuous circumferential alignment ridge 126 extends from the smooth surface 124 around the circumference of the mounting plate 118. In this way, the circumferential alignment ridge 126 and the central alignment ridge 142 act as an alignment device for the self-engaging mounting element 116 and facilitate alignment of the self-engaging mounting element 116 on the smooth surface 124 when the self-engaging mounting element 116 is adhered to the smooth surface 124. The self-engaging mounting element 116 may, in embodiments, be sized so as to be snugly against the circumferential alignment ridge 126 and/or the central alignment ridge 142, or the self-engaging mounting element 116 may be sized such that a space is provided between the circumferential alignment ridge 126 and/or the central alignment ridge 142. As shown in FIG. 15, the self-engaging mounting element 116 is snugly abutted against the central alignment ridge 142, but a space is provided between the self-engaging mounting element 116 and the circumferential alignment ridge 126.

As shown in FIG. 15, the outer diameter of the self-engaging mounting element 116 is smaller than the outer diameter of the mounting plate 118 such that the entire self-engaging mounting element 116 is contained on smooth surface 124. In embodiments, the circular shape of the mounting plate 118 has an outer diameter $OD_1$ of from 30 mm to 50 mm. In other embodiments, the circular shape of the mounting plate 118 has an outer diameter $OD_1$ of from 35 mm to 45 mm, and in a specific embodiment, the circular shape of the mounting plate 118 has an outer diameter $OD_1$ of about 41.3 mm. In embodiments, the circular shape of the self-engaging mounting element 116 has an outer diameter $OD_2$ of from 27 mm to 47 mm. In other embodiments, the circular shape of the self-engaging mounting element 116 has an outer diameter $OD_2$ of from 32 mm to 42 mm, and in a specific embodiment, the circular shape of the self-engaging mounting element 116 has an outer diameter $OD_2$ of about 38.1 mm.

Figure 16:
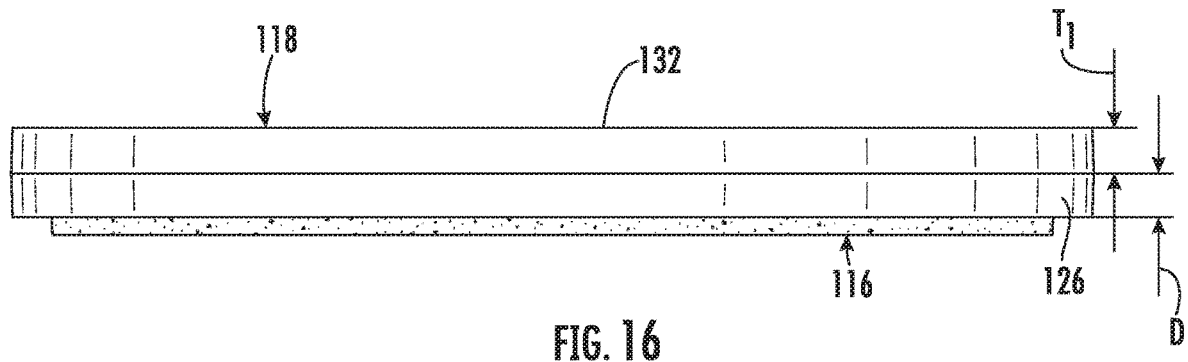
FIG. 16 is a side view of the mounting plate and self-engaging mounting element.
Figure 17:
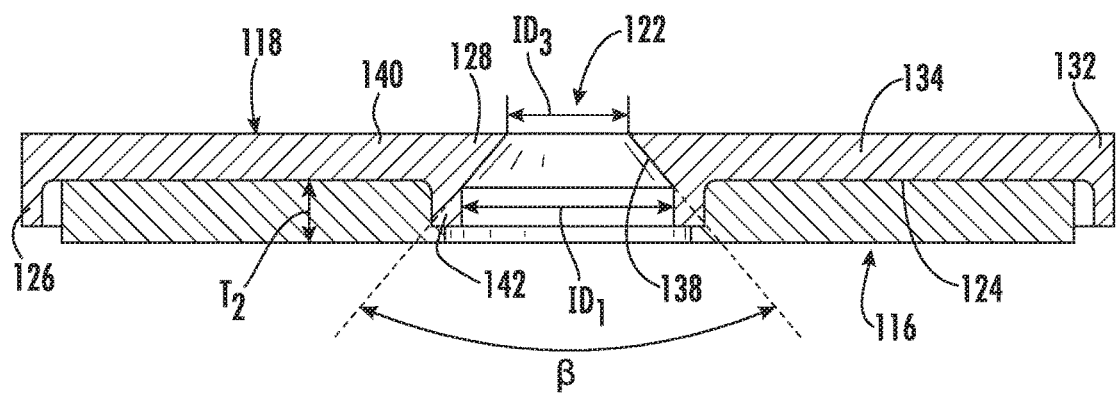
FIG. 17 is a cross-section view of the mounting plate and self-engaging mounting element taken along line 17-17 of FIG. 12.

Referring now to FIGS. 16 and 17, a side view and a cross-section view of the mounting plate 118 and self-engaging mounting element 116, respectively, can be seen. In the embodiment depicted, the circumferential alignment ridge 126 and/or central alignment ridge 142 extends from the smooth surface 124 a first distance D that is less than the thickness $T_2$ of the self-engaging mounting element 116. That is, the self-engaging mounting element 116 protrudes from the smooth surface 124 a farther distance than does the circumferential alignment ridge 126 and/or the central alignment ridge 142. In embodiments, the circumferential alignment ridge 126 and/or the central alignment ridge 142 extends to no more than 75% of the thickness $T_2$ of the self-engaging mounting element 116. In other embodiments, the circumferential alignment ridge 126 and/or the central alignment ridge 142 extends to no more than 60% of the thickness $T_2$ of the self-engaging mounting element 116, and in still other embodiments, the circumferential alignment ridge 126 and/or the central alignment ridge 142 extends to no more than 50% of the thickness $T_2$ of the self-engaging mounting element 116. In embodiments, the thickness $T_2$ of the self-engaging mounting element 116 is from 2 mm to 3 mm (e.g., about 2.35 mm). In embodiments, the circumferential alignment ridge 126 and/or the central alignment ridge 142 extends a distance of from 1 mm to 2 mm (e.g., about 1.65 mm) from the smooth surface 124.

In the embodiment depicted in FIG. 17, the opening 122 has frustoconical surface 138 such that the diameter $D_1$ of the opening 122 at the smooth surface 124 is greater than the diameter $ID_3$ of the opening 122 at the reinforcing surface 125. In embodiments, the diameter $ID_1$ is from 6 mm to 10 mm (e.g., about 8.4 mm), and in embodiments the diameter $ID_3$ is from 3.5 mm to 7.5 mm (e.g., about 5.3 mm). The frustoconical surface 138 of the opening 122 tapers from the smooth surface 124 to the reinforcing surface 125. In embodiments, the opening 122 defines an angle β of from 70° to 100°. In other embodiments, the opening 122 defines an angle β of from 80° to 90°, and in a specific embodiment, the opening 22 defines an angle β of about 82°. An opening 122 as described and as shown in FIG. 17 can be used to eliminate interference between the self-engaging mounting elements 12, 116 by providing a recess to accommodate the head of the fastener 14, e.g., the head of a wood screw, a drywall screw, or another countersunk screw. In other embodiments, the recess may also take the form of a stepped surface in which the recess has a uniform diameter which accommodates a fastener 14, such as a nail or bolt head.

FIGS. 18-21 depict another embodiment of a mounting plate 218. In function and manner of attachment to a wall panel 10 and wall/structure 20, the mounting plate 218 is similar to the mounting plate 18 of FIGS. 1-11 and to the mounting plate 118 of FIGS. 12-17. In particular, the above discussion of mounting plate 18 with respect to attachment to the wall/structure 20 depicted in FIGS. 1-4 entirely or substantially applies to the mounting plate 218 of FIGS. 12-17.

Figure 18:
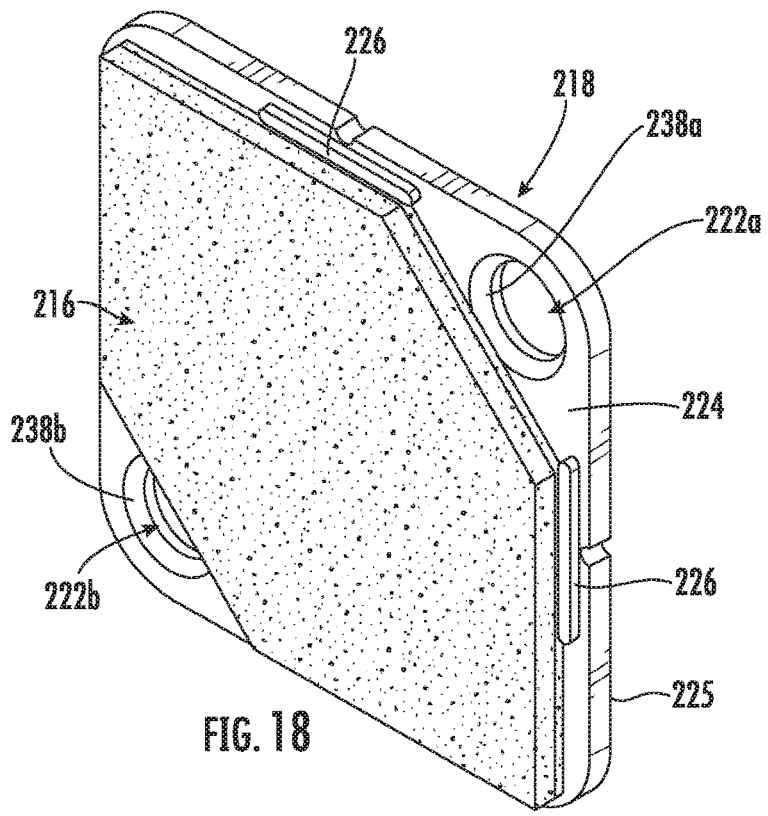
FIG. 18 is a perspective view of a mounting plate according to a further embodiment of the invention.

Referring to FIG. 18, a mounting plate 218 according to a third embodiment is depicted. As shown in FIG. 18, the mounting plate 218 includes a square shape with rounded corners. In a preferred embodiment, the mounting plate 218 is injection molded from an appropriate plastic or stamped and punched from a metal sheet into the shape shown in the FIG. 18. As can be seen, the mounting plate 218 includes a first surface 224 on which a self-engaging mounting element 216 attached. The mounting element 216 is bounded by at least one peripheral alignment ridge 226. Further, as can be seen in FIG. 18, the mounting plate 218 includes a first opening 222a and a second opening 222b. The openings 222a, 222b extend through the thickness of the mounting plate 218 from the first surface 224 to a second surface 225. Further, in embodiments, each opening 222a, 222b tapers from the first surface 224 to the second surface 225 so as to define frustoconical surfaces 238a, 238b, respectively. In such embodiments, the diameter of the openings 222a, 222b at the first surface 224 and at the second surface 225 are the same as those described in the previous embodiments and define an angle as described in the previous embodiments. The frustoconical surfaces 238a, 238b accommodate the head of a countersunk fastener 14 (e.g., a wood screw or a drywall screw). However, in other embodiments, the openings 222a, 222b may be configured to accommodate the head of another type of fastener, such as a nail or bolt.

Figure 19:
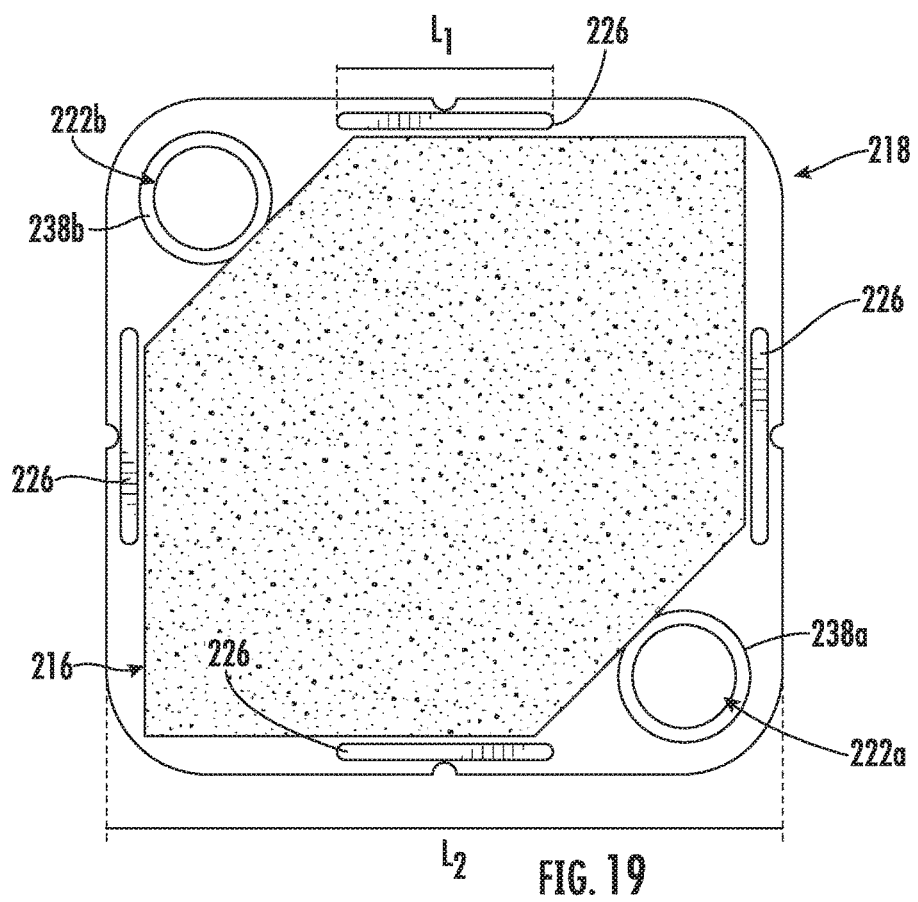
FIG. 19 is a view of a first surface of the mounting plate of FIG. 18.

FIG. 19 provides a view of the first surface 224. In the embodiment depicted, the first surface 224 of the mounting plate 218 includes four peripheral alignment ridges 226, located on each edge of the square-shaped mounting plate 218. In embodiments, the length $L_1$ of each peripheral alignment ridge 226 is a fraction of the side length $L_2$ of the mounting plate 218. In embodiments, length $L_1$ of each peripheral alignment ridge 226 is from 0.1 $L_2$ to 0.5 $L_2$. In a particular embodiment, the length $L_1$ of each peripheral alignment ridge 226 is about 0.25 $L_2$. In embodiments, the length $L_1$ of each peripheral alignment ridge 226 is from 5 mm to 30 mm (e.g., about 13.7 mm), and the length $L_2$ of each side of the mounting plate 218 is from 25 mm to 75 mm (e.g., about 55.5 mm).

Further, as shown in FIG. 19, the self-engaging mounting element 216 is hexagonal in shape. Particularly, in FIG. 19, the self-engaging mounting element 216 is essentially a square with two corners removed corresponding to the locations of the openings 222a, 222b. Further, in embodiments, the remaining two corners of the self-engaging mounting element 216 preferably extend proximal to the rounded corners of the mounting plate 218.

Figure 20:
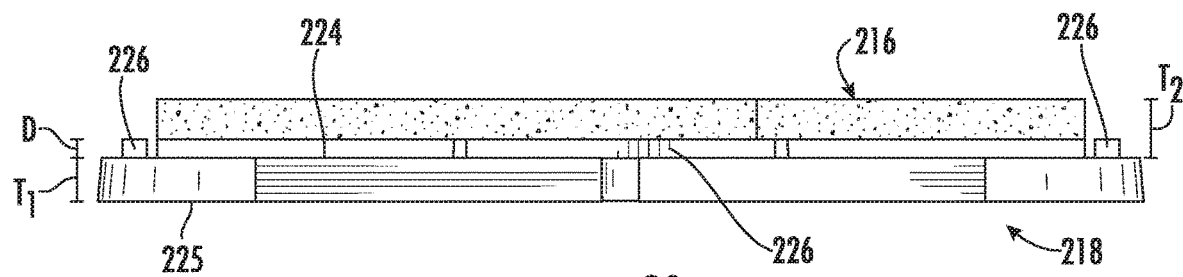
FIG. 20 is a side view of the mounting plate.

FIG. 20 provides a side view of the mounting plate 218 and self-engaging mounting element 216. In embodiments, the self-engaging mounting element 216 has a second thickness $T_2$ of from 2 mm to 3 mm (e.g. about 2.35 mm). Each peripheral alignment ridge 226 extends from a first surface a distance D of from about 0.5 mm to about 2 mm. In the embodiment depicted, each peripheral alignment ridge 226 extends a distance D of about 0.8 mm. However, in other embodiments, the peripheral alignment ridge 226 extends a fraction of the thickness $T_2$ of the self-engaging mounting element 216, e.g., a distance D of 0.25 $T_2$, to 0.75 $T_2$.

Figure 21:
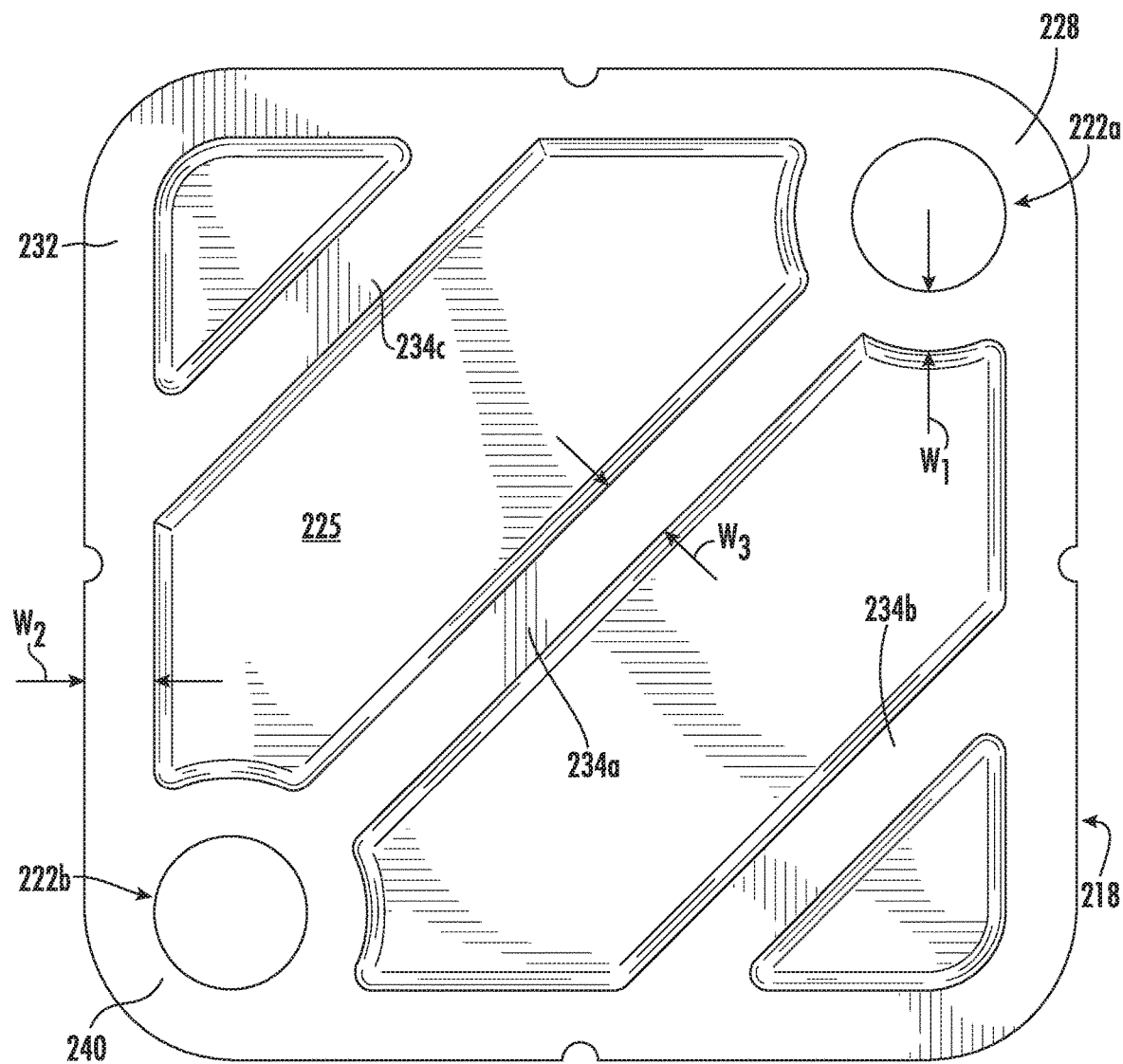
FIG. 21 is a view of a second surface of the mounting plate.

FIG. 21 depicts a view of the second surface 225 of the mounting plate 218. The second surface 225 includes a first collar 228 surrounding the first opening 222a and a second collar 240 surrounding the second opening 222b. The collars 228, 240 are integral with a peripheral rib 232. A plurality of stiffening ribs, shown as stiffening ribs 234a-c, are provided diagonally across the mounting plate 218. A first stiffening rib 234a extends between the first collar 228 and the second collar 240. A second stiffening rib 234b and a third stiffening rib 236c are on either side of the first stiffening rib 234a and extend between regions of the peripheral rib 132. While three stiffening ribs 234a-c are depicted in FIG. 21, fewer or more stiffening ribs may be provided in other embodiments.

In embodiments, the first collar 228 and/or second collar 240 has a width $W_1$ of from 1.5 mm to 2 mm (e.g., about 2.6 mm). In embodiments, the peripheral rib 232 has a width $W_2$ of from 2 mm to 4 mm (e.g., about 3 mm). In embodiments, each of the radial ribs 234a-c has a width $W_3$ of from 2 mm to 4 mm (e.g., about 3.2 mm). Further, in embodiments, the first collar 228, the second collar 240, the peripheral rib 232, and the stiffening ribs 234a-c have a height of from 0.5 mm to 1.5 mm (e.g., about 1.1 mm). As with the previous embodiments, the combination of the collars 228, 240, peripheral rib 232, and stiffening ribs 234a-c rigidify and strengthen the mounting plate 218.

With reference to FIGS. 20 and 21, the collars 228, 240, peripheral rib 232, and stiffening ribs 234a-c also provide a thickness $T_1$ to the mounting plate 118. In embodiments of the mounting plate 218, the mounting plate 218 has a thickness $T_1$ of from 1 mm to 2.5 mm (e.g., about 1.8 mm) as measured from the plane defined by the highest reinforcing feature (collars 228, 240, peripheral rib 232, and/or stiffening ribs 234a-c) to the plane of the first surface 224.

In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. For example, another example of the mounting elements are a combination of magnets and/or ferromagnetic materials.

What is claimed is:

1. A mounting plate, comprising:
   a first smooth surface;
   a second reinforcement surface opposite the first smooth surface;
   a first opening extending between the first smooth surface and the second reinforcement surface;
   a first collar surrounding the first opening and extending from the first smooth surface and the second reinforcement surface;
   a peripheral rib extending from the second reinforcement surface;
   a plurality of radial ribs extending from the second reinforcement surface between the first collar and the peripheral rib; and
   a self-engaging mounting unit adhered to the first smooth surface, the self-engaging mounting unit having a centrally located aperture, a first adhesive side that adheres to the first smooth surface of the mounting plate and a second fastener material side fabricated from a touch fastener material.

2. The mounting plate of claim 1, further comprising at least one alignment ridge extending about a periphery from the first smooth surface that aligns the self-engaging mounting unit on the first smooth surface.

3. The mounting plate of claim 2, wherein the first smooth surface and the second reinforcement surface are circular and wherein the at least one alignment ridge is a circumferential alignment ridge.

4. The mounting plate of claim 3, further comprising a central alignment ridge extending from the first smooth surface and surrounding the opening.

5. The mounting plate of claim 3, further comprising a second collar that surrounds the first collar and is located intermediate of the first collar and the peripheral rib.

6. The mounting plate of claim 3, wherein the plurality of radial ribs is eight radial ribs.

7. The mounting plate of claim 1, wherein the first opening has a first diameter on the first smooth surface and a second diameter on the second reinforcement surface and wherein the first diameter is greater than the second diameter.

8. The mounting plate of claim 7, wherein the first opening defines a frustoconical surface between the first smooth surface and the second reinforcement surface and wherein the frustoconical surface tapers at an angle of between 70° and 100°.

9. The mounting plate of claim 1, wherein the first adhesive side of the self-engaging mounting unit is attached to the first smooth surface of the mounting plate, and wherein the second fastener material side of the self-engaging mounting unit is attached to a wall panel.

10. A mounting plate, comprising:
    a first smooth surface;
    a second reinforcement surface opposite the first smooth surface;
    a first opening extending between the first smooth surface and the second reinforcement surface;
    a first collar surrounding the first opening and extending from the first smooth surface and second reinforcement surface;
    a peripheral rib extending about a periphery from the second reinforcement surface;
    a plurality of ribs on the second reinforcement surface, wherein each of the plurality of ribs extend from the first collar to the peripheral rib; and
    a self-engaging mounting unit coupled to the first smooth surface, the self-engaging mounting unit having a first adhesive side and a second fastener material side and including a centrally located aperture aligned with the first opening, wherein the first adhesive side is adhered to the first smooth surface of the mounting plate, and wherein the second fastener material side of the self-engaging mounting unit is attached to a second self-engaging mounting unit coupled to a wall panel.

11. The mounting plate of claim 10, further comprising a second collar surrounding the first collar and extending from the first smooth surface, wherein each of the plurality of ribs extend from the first collar through the second collar and to the peripheral rib.

* * * * *